Jan. 31, 1939. G. HAUMANN 2,145,599
DISPLAY DEVICE
Filed May 13, 1937 3 Sheets-Sheet 1

Inventor
George Haumann
By Arthur F. Durand
Atty.

Jan. 31, 1939.   G. HAUMANN   2,145,599
DISPLAY DEVICE
Filed May 13, 1937   3 Sheets-Sheet 2
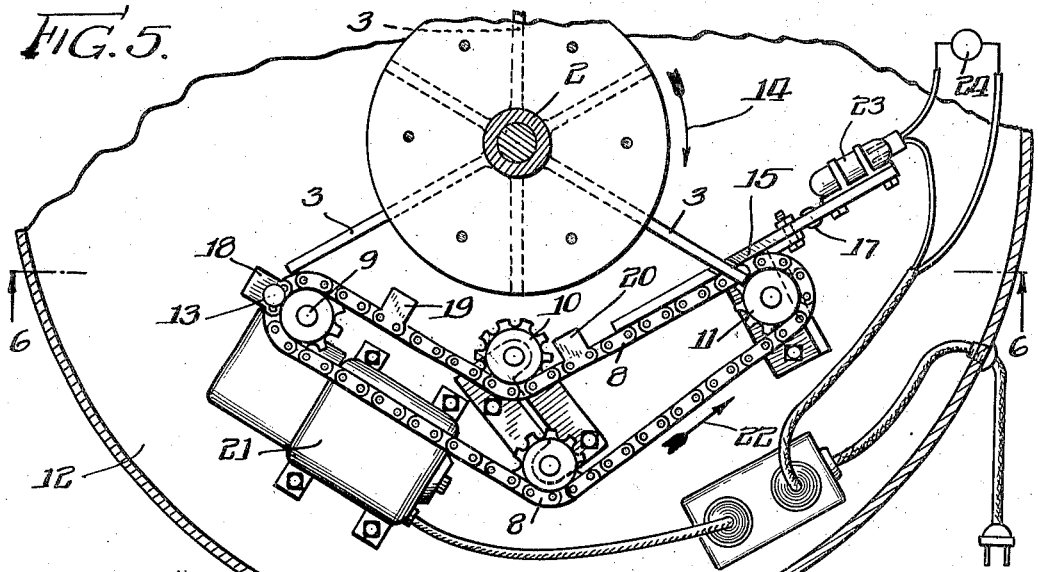
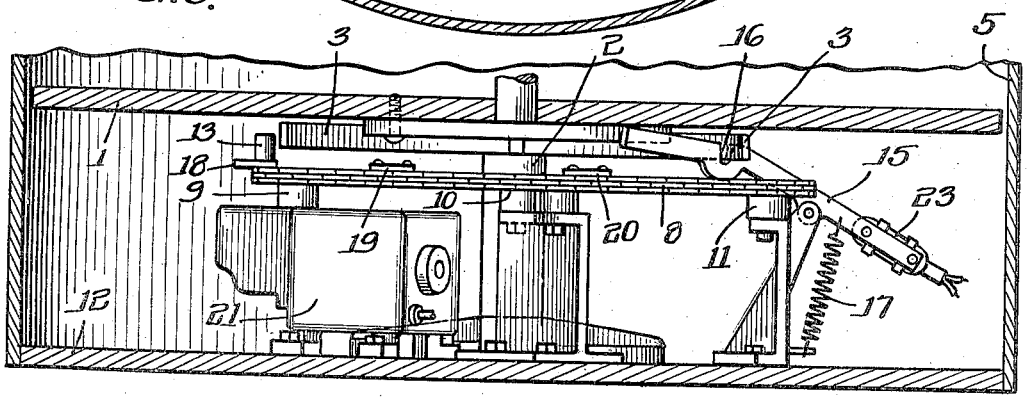
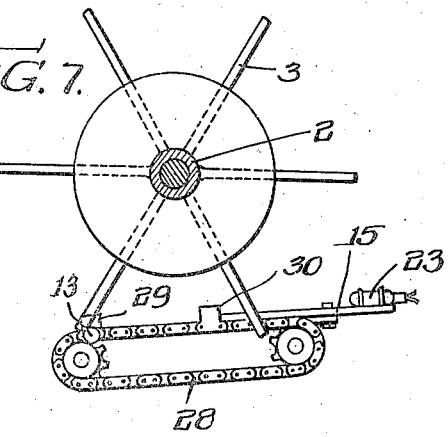
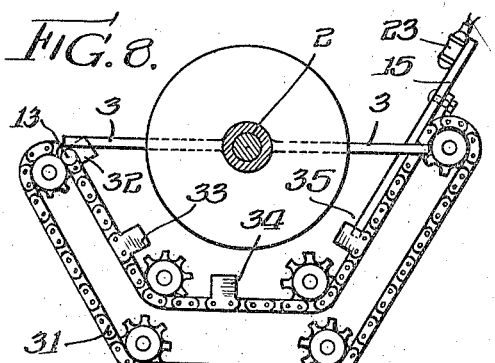
Inventor
George Haumann Jan. 31, 1939.    G. HAUMANN    2,145,599
DISPLAY DEVICE
Filed May 13, 1937    3 Sheets-Sheet 3
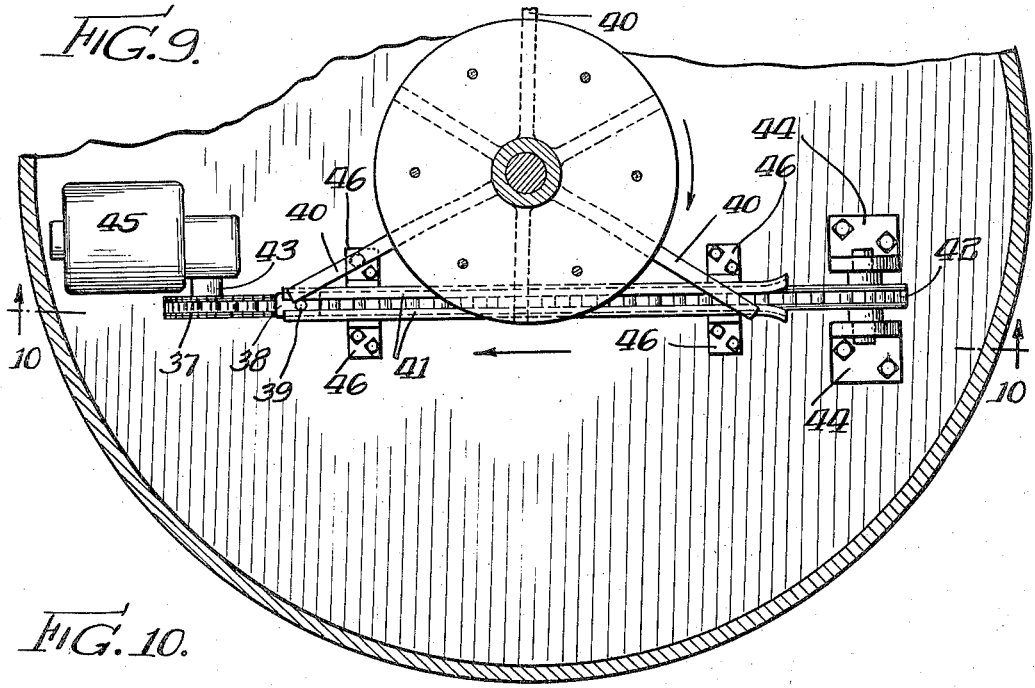
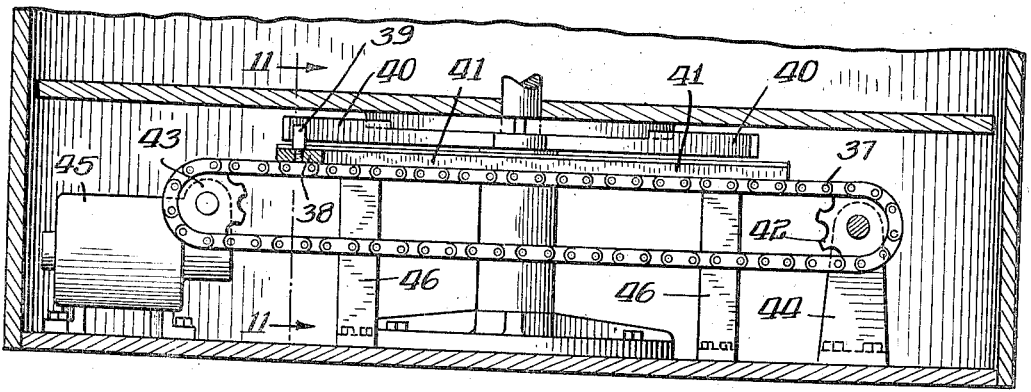
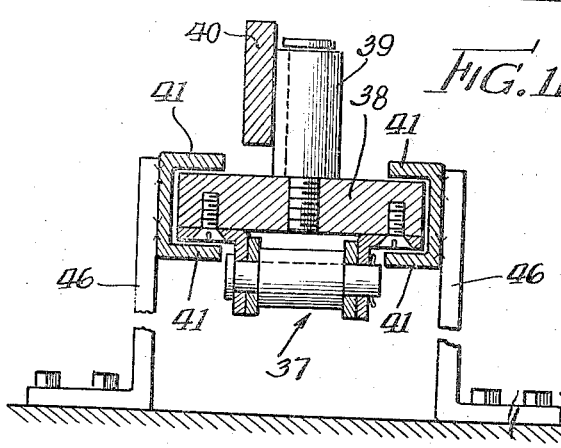
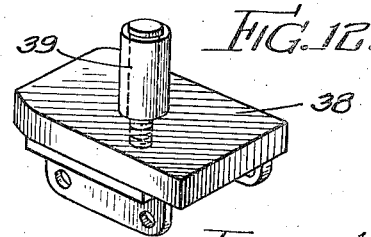
Inventor
George Haumann Patented Jan. 31, 1939

2,145,599

UNITED STATES PATENT OFFICE 2,145,599

DISPLAY DEVICE

George Haumann, Chicago, Ill.

Application May 13, 1937, Serial No. 142,440

17 Claims. (Cl. 312—99.5)

This invention relates to devices for displaying articles or commodities in stores and other places, such as those employed, for example, in windows of stores.

Generally stated, the object of the invention is to provide a novel and improved construction and arrangement whereby a rotary turn table is provided, upon which the articles or commodities may be supported, and which is intermittently rotated to bring the articles or commodities successively into view, through an opening provided for that purpose, and which is then held stationary for the length of time necessary to display the article or commodity in a stationary position back of said opening.

It is also an object to provide certain details and features of construction and combinations tending to increase the general efficiency and desirability of a display device of this particular character.

To the foregoing and other useful ends, the invention consists in matters hereinafter set forth and claimed and shown in the accompanying drawings, in which—

Fig. 5 is an enlarged horizontal section on line 5—5 in Fig. 2 of the drawings, showing certain portions broken away for convenience of illustration.

Fig. 6 is a vertical section on line 6—6 in Fig. 5 of the drawings.

Fig. 7 is a diagrammatic view showing a different form of the invention.

Fig. 8 is a similar view showing another form of the invention.

Fig. 9 is a plan view showing a different form of the invention.

Fig. 10 is a vertical section on line 10—10 in Fig. 9 of the drawings.

Fig. 11 is an enlarged detail section on line 11—11 in Fig. 10 of the drawings.

Fig. 12 is a perspective of certain parts shown in Figs. 9, 10, and 11 of the drawings.

Figure 1:
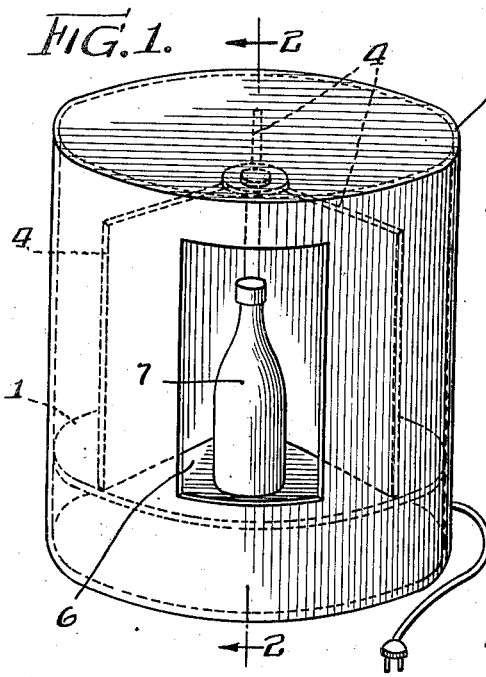
Fig. 1 is a perspective of a display device embodying the principles of the invention.
Figure 2:
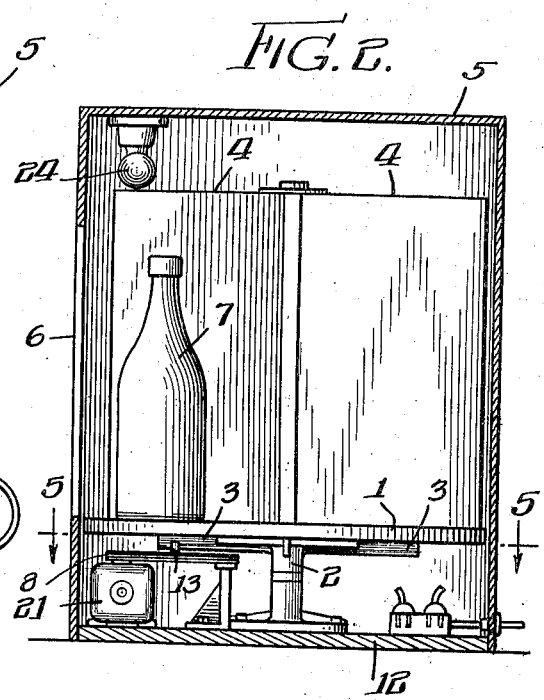
Fig. 2 is a vertical section on line 2—2 in Fig. 1 of the drawings.

Referring to Figs. 1, 2, 5 and 6 of the drawings, the invention comprises a disk 1, forming a rotary turn table, provided on its under side with a hub 2, having three projecting arms 3 on the under side of said turn table. Vertical and radially arranged partitions 4 are provided on the upper side of the turn table, to form compartments thereon. A cylindrical housing 5 encloses the turn table, and is provided at its front with an opening 6, through which the bottle 7, or other article or commodity, is viewed.

A sprocket chain 8 is arranged to operate (in its entirety) in a horizontal plane, below said turn table 1, and for that purpose is mounted on sprockets 9, 10 and 11, as shown in Fig. 5 of the drawings, these sprockets being suitably supported on brackets rigidly mounted on the base 12 of said housing. Said sprocket chain carries an upstanding roller 13, which successively engages the arms 3 to intermittently rotate the turn table in the direction indicated by the arrow 14, shown in Fig. 5 of the drawings. A pivoted arm 15 is provided with a notch 16 for engaging the lower edges of the arms 3, being held in this engaging position by a spring 17, thereby to stop the rotation of the turn table whenever an article or commodity is opposite the opening 6 in the housing. To release this latching device, the sprocket chain 8 is provided with lugs 18, 19 and 20, the same in number as the arms 3, for engagement with the upper edge of the arm 15, thereby to press the latter downwardly and disengage its notch 16 from the arm 3.

A suitable electric motor 21 operates the sprocket 9, thereby to operate the sprocket chain in the direction indicated by the arrow 22, shown in Fig. 5 of the drawings.

There is preferably a mercury switch 23 on the tail portion of the arm 15, and this switch is operated by the tilting movement of said arm. A lamp 24 is provided within the housing, above the partitions 4, to illuminate the article or commodity, such as the bottle 7, when the latter arrives opposite the opening 6 in the side of the housing. The circuit of this lamp is controlled, as indicated in Fig. 5 of the drawings, by the said mercury switch 23, in such a manner that the circuit is open while the turn table is rotating, but is closed each time the table is stationary. This is because the lugs 18, 19 and 20 keep the arm 15 depressed during the rotary motion of the turn table, and only allow this arm to rise when the turn table stops rotating with another arm 3 in position to engage the notch 16 in said arm, as shown in Fig. 5 of the drawings.

Figure 3:
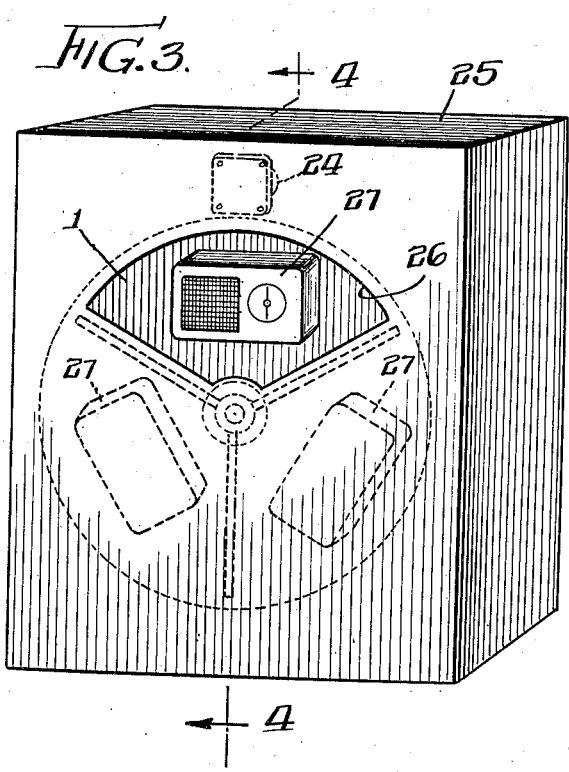
Fig. 3 is a view similar to Fig. 1, showing a different form of the invention.
Figure 4:
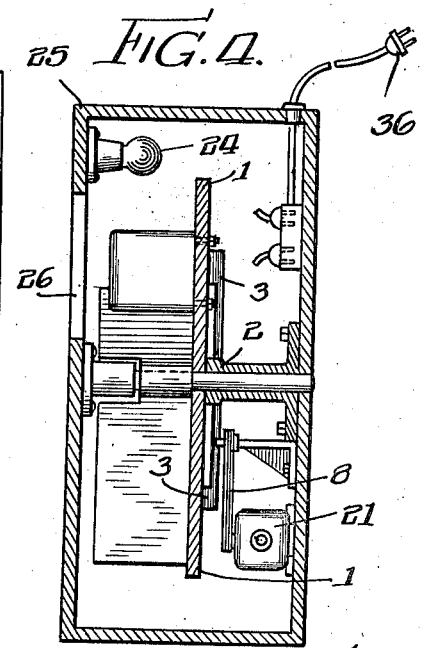
Fig. 4 is a vertical section on line 4—4 in Fig. 3 of the drawings.

In Figs. 3 and 4 of the drawings, the construction of the turn table and its operating mechanism and the lamp control are the same as that previously described, but in this case the turn table 1 is turned into position to rotate about a horizontal axis instead of about a vertical axis, and a rectangular housing 25 is provided for enclosing the turn table and its operating mechanism. The flat front wall of this housing 25 is provided with an opening 26 through which to view the radio 27, or any other article fastened to the turn table. Otherwise, the construction and mode of operation are the same as that previously described.

In Fig. 7 of the drawings, there are six arms 3, instead of only the three arms previously described, for the turn table, and hence the latter makes six stops in its complete rotation. For this purpose, a shorter sprocket chain 28 is employed, with only two lamp switch controlling lugs 29 and 30, but otherwise the construction is similar to that previously described.

In Fig. 8 of the drawings, the turn table has only two arms 3, arranged diametrically opposite, and the sprocket chain 31 is provided with four lamp switch controlling lugs 32, 33, 34 and 35, for controlling the lamp in the desired manner.

Thus, in each form of the invention, a rotary turn table is provided which may rotate about either a vertical or horizontal axis, and to or upon which articles or commodities may be fastened or placed in position for display through an opening in the housing in which the turn table and its operating mechanism are enclosed. In each form of the invention, the latch for the turn table, for holding the latter stationary the desired length of time necessary or desirable for displaying each particular article or commodity, is also employed for controlling a circuit or a lamp for illuminating the article or commodity, when the latter is stationary in position to be viewed through the opening in the housing.

A display device of this character can be used in stores or other places, or in store windows, conveniently and effectively, for the display of various articles or commodities, and, in addition, it may be used as an amusement device, for displaying things merely for amusement, and can also be used for displaying advertising of one kind or another.

Referring to Figs. 9, 10, 11, and 12 of the drawings, the construction is similar to that previously described, but in this case the endless chain 37 (in its entirety) operates in a vertical plane, and is provided with a plate 38 having an upstanding roller 39 on the top thereof. The turn table has three equidistant arms 40, to be engaged by the roller 39, so that the turn table makes one-third of a rotation each time it is moved by engagement of the roller 39 with one of the arms 40 of the turn table. Preferably, the plate 38 is supported in a guideway 41 while the turn table is being rotated, so that the chain sustains no lateral thrust or strain. The chain 37 is supported by sprockets 42 and 43, as shown, with a fixed bracket 44 for supporting the sprocket 42, while the sprocket 43 is supported by the body of the electric motor 45, whereby this motor is operative to operate the chain 37 at the desired speed of travel. It will also be seen that the guideway 41 is supported by fixed brackets 46 of any suitable character.

In each form of the invention, the housing thereof is portable and may be placed in a window or on a store counter, or on a table or other place, and a flexible plug and cord connection 36 may be provided for insertion in any convenient electrical outlet.

Therefore, in each form of the invention, the traveling means have a plurality of straight line paths of travel, as shown in Figs. 5, 6, 7, 8, and 10 of the drawings, and also a plurality of curves therein about a plurality of parallel axes. In Figs. 5 to 8 inclusive said parallel axes are vertical, whereas in Figs. 9 and 10 the parallel axes are horizontal.

The lugs or projections on the sprocket chain, in each form of the invention, are either spaced or so arranged as to enable the rotary turn table or other member to remain stationary for a period of time after its disengagement from each lug or projection. As shown, the engaging portions for the turn table are in the form of radial arms, but any suitable radial formation whereby the lugs or projections on the link belt can engage and disengage and slide a distance on each radial formation, may be used if desired. Of course, the exact period of time during which the rotary turn table or other member remains stationary will depend upon the spacing of the lugs or projections on the link belt, and upon the speed of intermittent rotation that is desired for any particular purpose.

It will be seen, therefore, that in each form of the invention the radial arms 3, or arms which are substantially radial for this purpose, are disposed in a common plane between the turn table and the link belt or other traveling means, which is of advantage structurally and in the operation of the apparatus for more effectively serving the ultimate purpose of the invention. That means, of course, that the turn table itself is in a plane between the articles displayed thereon and the said projecting arms, and this is true regardless of whether the latter and the turn table are horizontal, or are in vertical planes as shown in Fig. 4 of the drawings, for in each form of the invention the turn table is between the arms and the articles displayed on the turn table. This means that the display surface of the turn table is smooth and unobstructed in any way whatever, and may be used for the proper or desired positioning of articles thereon in practically any desired manner.

What I claim as my invention is:

1. In a display device, a rotary turn table upon one side of which articles or commodities or other things may be placed for display, a wall having an opening therein through which to view said articles or commodities in succession, and operating mechanism for intermittently rotating the turn table, to bring the articles or commodities successively into position to be viewed through said opening, said mechanism comprising arms rigid with and disposed on the other side of said turn table, so that the latter is between the arms and the articles, traveling means having a plurality of straight line paths of travel, and also a plurality of curves therein about a plurality of parallel axes, for successively engaging said arms, thereby to rotate the turn table the desired distance each time, and a latching device engageable with said arms, for maintaining the turn table in fixed stationary position, for a predetermined length of time, at the end of each partial rotation of the turn table, said arms being disposed in a common plane between said traveling means and said turn table.

2. A structure as specified in claim 1, said traveling means comprising a sprocket chain supported to operate in a plane parallel with the plane of the turn table, provided with means for engaging said arms, and also with means for disengaging said latching device.

3. A structure as specified in claim 1, said traveling means having means for automatically disengaging said latching device.

4. A structure as specified in claim 1, comprising an electric lamp for illuminating the article or commodity on display, and a switch operated automatically by said latching device to control the circuit of said lamp, so that said circuit is open during each partial rotation of the turn table, but is closed while the turn table is stationary.

5. A structure as specified in claim 1, in which the said turn table rotates about a vertical axis.

6. A structure as specified in claim 1, in which the said turn table rotates about a horizontal axis.

7. A structure as specified in claim 1, said wall forming one side of a portable housing for enclosing the turn table and its said operating mechanism.

8. A structure as specified in claim 1, said parallel axes being vertical.

9. A structure as specified in claim 1, said parallel axes being horizontal.

10. In a display device, a rotary turn table upon which articles or commodities or other things may be placed for display, a wall having an opening therein through which to view said articles or commodities in succession, and operating mechanism for intermittently rotating the turn table, to bring the articles or commodities successively into position to be viewed through said opening, said mechanism comprising radial arms on said turn table, disposed in a common plane between said turn table and said mechanism, traveling means for successively engaging said arms, thereby to rotate the turn table the desired distance each time, and a latching device for maintaining the turn table in fixed stationary position, for a predetermined length of time, at the end of each partial rotation of the turn table, said traveling means comprising a sprocket chain supported to operate in a plane parallel with the plane of the turn table, provided with means for engaging said arms, and also with means for disengaging said latching device.

11. In a display device, a rotary turn table upon which articles or commodities or other things may be placed for display, a wall having an opening therein through which to view said articles or commodities in succession, and operating mechanism for intermittently rotating the turn table, to bring the articles or commodities successively into position to be viewed through said opening, said mechanism comprising radial arms on said turn table, traveling means for successively engaging said arms, thereby to rotate the turn table the desired distance each time, and a latching device for maintaining the turn table in fixed stationary position for a predetermined length of time, at the end of each partial rotation of the turn table, said traveling means having means for automatically disengaging said latching device.

12. In a display device, a rotary turn table upon which articles or commodities or other things may be placed for display, a wall having an opening therein through which to view said articles or commodities in succession, and operating mechanism for intermittently rotating the turn table, to bring the articles or commodities successively into position to be viewed through said opening, said mechanism comprising radial arms on said turn table, traveling means for successively engaging said arms, thereby to rotate the turn table the desired distance each time, a latching device for maintaining the turn table in fixed stationary position, for a predetermined length of time, at the end of each partial rotation of the turn table, illuminating means including an electric lamp for illuminating the article or commodity on display, and a switch operated automatically by said latching device to control the circuit of said lamp, so that said circuit is open during each partial rotation of the turn table, but is closed while the turn table is stationary.

13. In a display device, a rotary turn table upon one side of which articles or commodities or other things may be placed for display, and operating mechanism for intermittently rotating the turn table, to bring the articles or commodities successively into position to be viewed, said mechanism comprising arms rigid with and disposed on the other side of said turn table, so that the latter is between the arms and the articles, traveling means having a plurality of straight line paths of travel, and also a plurality of curves therein about a plurality of parallel axes, for successively engaging said arms, thereby to rotate the turn table the desired distance each time, and a latching device engageable with said arms, for maintaining the turn table in fixed stationary position, for a predetermined length of time, at the end of each partial rotation of the turn table, said arms being disposed in a common plane between said traveling means and said turn table.

14. A structure as specified in claim 13, said traveling means operating in a plane at right angles to the plane of said turn table.

15. A structure as specified in claim 13, said traveling means operating in a plane parallel with the plane of said turn table.

16. A structure as specified in claim 13, the axis of said turn table being vertical.

17. A structure as specified in claim 13, the axis of said turn table being horizontal.

GEORGE HAUMANN.